United States Patent [19]

Amano et al.

[11] Patent Number: 5,312,581
[45] Date of Patent: May 17, 1994

[54] METHOD FOR FORMING CONNECTOR TERMINAL ELECTRODES OF A LAMINATION CAPACITOR

[75] Inventors: Koshi Amano; Seiichi Katsumata, both of Kyoto, Japan

[73] Assignee: Rohm Co., Ltd., Kyoto, Japan

[21] Appl. No.: 56,781

[22] Filed: May 4, 1993

[30] Foreign Application Priority Data

Jun. 16, 1992 [JP] Japan .................. 4-156641

[51] Int. Cl.⁵ .............................................. B22F 3/10
[52] U.S. Cl. ........................................ 419/8; 419/31; 428/548; 428/551; 428/552
[58] Field of Search ................. 75/0.5 R; 148/431; 317/258; 338/21; 361/308, 309, 321; 419/8, 31; 428/548, 551, 552

[56] References Cited

U.S. PATENT DOCUMENTS

| | | | |
|---|---|---|---|
| 3,679,950 | 7/1972 | Rutt | 317/258 |
| 4,158,218 | 6/1979 | McLaurin et al. | 361/308 |
| 4,500,368 | 2/1985 | Maher | 148/431 |
| 4,568,384 | 2/1986 | Maher | 75/0.5 R |
| 4,584,629 | 4/1986 | Garcia et al. | 361/321 |
| 4,675,644 | 6/1987 | Ott et al. | 338/21 |
| 4,811,162 | 3/1989 | Maher et al. | 361/308 |
| 4,819,128 | 4/1989 | Florian et al. | 361/321 |
| 5,128,827 | 7/1992 | Yokotani et al. | 361/309 |
| 5,251,094 | 10/1993 | Amano et al. | 361/308.2 |

Primary Examiner—Donald P. Walsh
Assistant Examiner—John N. Greaves
Attorney, Agent, or Firm—Cushman, Darby & Cushman

[57] ABSTRACT

An object of the present invention is to provide a method for forming connector terminal electrodes of a lamination capacitor which has firm connection between the internal electrodes and the connector terminal electrode. The ceramic main body part (10) having internal electrodes of palladium is put into a mixture of two powders, one being a silver powder (3) with a diffusion coefficient different from the internal electrodes and the other being a zirconium powder (2) which is inactive to both the internal electrode and the silver powder (3). The ceramic main body part (10) in the mixture is subjected to a heat treatment at a heat temperature. Thereafter a connector terminal electrode (20) is formed on each of the sides of the ceramic main body part (10).

20 Claims, 11 Drawing Sheets

| CASE 1 | | |
|---|---|---|
| SPECIFICATION = CAP (680PF±5%) | | |
| INITIAL TEST | | |
| | CAP | tan δ |
| 1 | *635.32 | 0.02 |
| 2 | *628.99 | 0.02 |
| 3 | 651.52 | 0.02 |
| 4 | *630.56 | 0.01 |
| 5 | *617.74 | 0.02 |
| 6 | 655.45 | 0.02 |
| 7 | *626.50 | 0.03 |
| 8 | *614.55 | 0.01 |
| 9 | *640.08 | 0.02 |
| 10 | 680.10 | 0.02 |
| 11 | 651.84 | 0.03 |
| 12 | *607.47 | 0.01 |
| 13 | 695.04 | 0.02 |
| 14 | *622.13 | 0.01 |
| 15 | *639.91 | 0.02 |
| 16 | 652.41 | 0.02 |
| 17 | 699.10 | 0.02 |
| 18 | *621.64 | 0.01 |
| 19 | *600.28 | 0.03 |
| 20 | *629.48 | 0.02 |
| 21 | *633.46 | 0.04 |
| 22 | *625.34 | 0.03 |
| 23 | *601.08 | 0.01 |
| 24 | 670.45 | 0.02 |
| 25 | 656.19 | 0.02 |
| 26 | *556.50 | 0.15 |
| 27 | *634.50 | 0.02 |
| 28 | 697.85 | 0.02 |
| 29 | 688.52 | 0.01 |
| 30 | *644.95 | 0.03 |
| X | 640.298 | 0.024 |
| MAX | 699.10 | 0.15 |
| MIN | 556.50 | 0.01 |
| PERCENTAGE OF CAPACITORS IN THE SPECIFICATION = 37% (11/30) | | |

FIG. 9

| CASE 2 | | | | |
|---|---|---|---|---|
| SPECIFICATION = CAP (680PF±5%) | | | | |
| | INITIAL TEST | | TV150 TEST | |
| | CAP | tan δ | CAP | tan δ |
| 1 | 695.80 | 00.2 | 698.92 | 00.2 |
| 2 | 694.80 | 00.2 | 694.91 | 00.2 |
| 3 | 648.25 | 00.3 | 648.36 | 00.2 |
| 4 | 659.58 | 00.3 | 659.72 | 00.2 |
| 5 | *642.77 | 00.3 | 642.82 | 00.1 |
| 6 | 656.74 | 00.3 | 656.87 | 00.2 |
| 7 | 671.86 | 00.9 | 671.97 | 00.2 |
| 8 | 653.32 | 00.2 | 653.41 | 00.1 |
| 9 | 685.41 | 00.1 | 684.76 | 00.9 |
| 10 | 662.89 | 00.2 | 662.93 | 00.1 |
| 11 | *656.81 | *1.52 | 656.98 | 00.3 |
| 12 | 668.56 | 00.2 | 668.69 | 00.2 |
| 13 | 652.31 | 00.1 | 652.40 | 00.1 |
| 14 | 674.43 | 00.2 | 674.50 | 00.1 |
| 15 | 680.29 | 00.3 | 679.73 | 00.1 |
| 16 | 678.50 | 00.3 | 678.10 | 00.1 |
| 17 | 688.52 | 00.2 | 688.57 | 00.1 |
| 18 | 645.72 | 00.2 | 645.86 | 00.2 |
| 19 | 645.00 | 00.3 | 645.09 | 00.1 |
| 20 | 629.54 | 00.2 | 629.63 | 00.1 |
| 21 | 682.43 | 00.3 | 682.51 | 00.1 |
| 22 | 685.45 | 00.2 | 685.53 | 00.1 |
| 23 | 647.97 | 00.5 | 648.00 | 00.0 |
| 24 | *635.96 | 00.1 | 636.11 | 00.2 |
| 25 | 679.50 | 00.3 | 679.50 | 00.2 |
| 26 | 680.00 | 00.3 | 679.60 | 00.1 |
| 27 | 678.90 | 00.3 | 678.96 | 00.1 |
| 28 | 691.75 | 00.2 | 691.50 | 00.1 |
| 29 | 698.11 | 00.2 | 698.20 | 00.1 |
| 30 | 681.11 | 00.2 | 681.10 | 00.1 |
| X̄ | 668.409 | 0.076 | 668.508 | 0.016 |
| MAX | 698.11 | 1.52 | 698.92 | 0.09 |
| MIN | 629.54 | 0.01 | 629.63 | 0.00 |
| PERCENTAGE OF CAPACITORS IN THE SPECIFICATION = 90% (27/30) | | | | |

FIG. 10

| CASE 3 | | | | |
|---|---|---|---|---|
| SPECIFICATION = CAP (680PF±5%) | | | | |
| | INITIAL TEST | | TV150 TEST | |
| | CAP | tanδ | CAP | tanδ |
| 1 | *624.50 | 0.01 | 624.46 | 0.02 |
| 2 | 688.49 | 0.03 | 688.44 | 0.02 |
| 3 | 685.36 | 0.01 | 685.37 | 0.01 |
| 4 | 652.34 | 0.01 | 652.11 | 0.01 |
| 5 | 674.54 | 0.02 | 674.31 | 0.02 |
| 6 | *624.88 | 0.03 | 624.65 | 0.03 |
| 7 | 680.04 | 0.02 | 680.00 | 0.02 |
| 8 | 670.00 | 0.02 | 699.74 | 0.02 |
| 9 | 655.19 | 0.02 | 654.21 | 0.01 |
| 10 | 679.04 | 0.02 | 678.81 | 0.02 |
| 11 | 652.93 | 0.01 | 652.69 | 0.02 |
| 12 | 685.31 | 0.04 | 685.13 | 0.04 |
| 13 | 681.76 | 0.02 | 681.70 | 0.02 |
| 14 | 687.16 | 0.03 | 687.09 | 0.02 |
| 15 | 680.41 | 0.02 | 680.39 | 0.02 |
| 16 | 680.93 | 0.01 | 680.70 | 0.02 |
| 17 | 677.91 | 0.02 | 677.64 | 0.02 |
| 18 | 669.64 | 0.02 | 669.42 | 0.02 |
| 19 | 690.94 | 0.01 | 690.70 | 0.02 |
| 20 | 666.76 | 0.03 | 666.74 | 0.01 |
| 21 | 686.81 | 0.02 | 686.81 | 0.03 |
| 22 | *557.17 | 0.02 | 556.93 | 0.02 |
| 23 | 653.22 | 0.02 | 652.99 | 0.02 |
| 24 | 680.34 | 0.02 | 680.10 | 0.02 |
| 25 | 647.33 | 0.03 | 647.29 | 0.02 |
| 26 | 692.54 | 0.02 | 692.54 | 0.02 |
| 27 | 667.75 | 0.02 | 667.46 | 0.02 |
| 28 | 659.82 | 0.02 | 659.56 | 0.02 |
| 29 | 695.27 | 0.02 | 695.01 | 0.02 |
| 30 | 691.13 | 0.02 | 690.90 | 0.03 |
| X̄ | 667.985 | 0.020 | 668.796 | 0.020 |
| MAX | 695.27 | 0.04 | 699.74 | 0.04 |
| MIN | 557.17 | 0.01 | 556.93 | 0.01 |
| PERCENTAGE OF CAPACITORS IN THE SPECIFICATION =90%(27/30) | | | | |

F I G. 11

|  | HEAT TEMPERATURE (°C) | HEAT TIME (MINUTE) | Ag POWDER (wt%) | ZrO2 POWDER (wt%) | LENGTH OF THE EXPOSED INTERNAL ELECTRODE PART (μm) | YIELD (%) | DEFLOCCULTION OF Ag |
|---|---|---|---|---|---|---|---|
| CASE 1 | — | — | — | — | 0 | 37 | — |
| CASE 2 | 823 | 8 | 25 | 75 | 0.007 | 90 | EASY |
| CASE 3 | 823 | 8 | 50 | 50 | 0.013 | 90 | IMPOSSIBLE |

METHOD FOR FORMING CONNECTOR TERMINAL ELECTRODES OF A LAMINATION CAPACITOR

BACKGROUND OF THE INVENTION

1. FIELD OF THE INVENTION

The present invention relates to a method for manufacturing a lamination capacitor and, more particularly, connector terminal electrode thereof.

2. DESCRIPTION OF THE RELATED ART

A lamination capacitor in general consists of a hexahedral ceramic main body part, a plurality of internal electrodes which divide the ceramic main body part into a plurality of alternating ceramic layers, and connector terminal electrodes which are formed on each side of the ceramic main body part so that they can make an electrical contact with internal electrodes.

Firm contact between the connector terminal electrodes and the internal electrodes is important for the lamination capacitor to prevent decrease in electric capacity and increase in dielectric loss tangent. Therefor, after calcining a ceramic main body part having the plurality of internal electrodes therein, the calcined ceramic main body part is subjected to a barrel finishing step to expose the internal electrodes from the sides of the ceramic main body part. Thereafter, the connector terminal electrode is formed on each side of the ceramic body part.

Figure 1A:
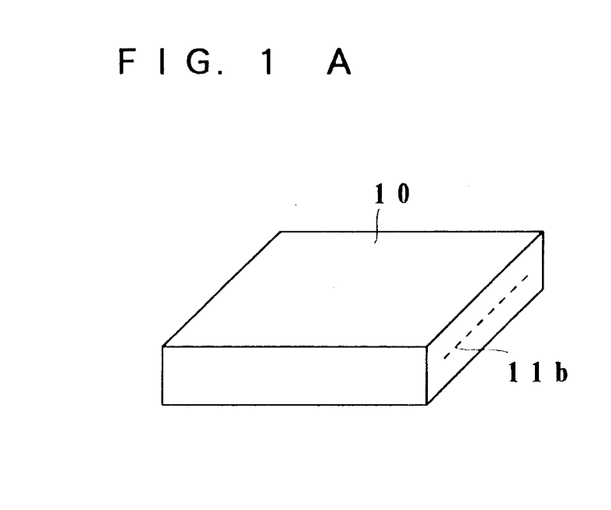
FIG. 1A is a perspective view showing a ceramic main body part of a lamination capacitor.
Figure 1B:
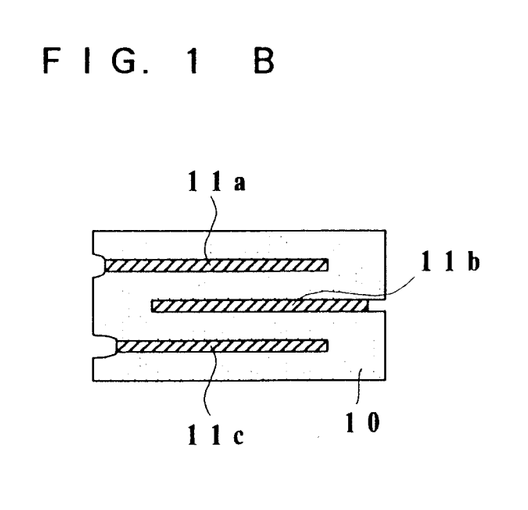
FIG. 1B is a cross-sectional view showing a ceramic main body part of a lamination capacitor.

These steps will be described more specifically to reference with figures. A lamination capacitor has a calcined ceramic main body part containing internal electrodes 11a, 11b and 11c arranged in alternating layers. In a ceramic main body part 10 of FIG. 1A, the internal electrode 11b is exposed from the side of the ceramic main body part. However, in general there is many cases where internal electrodes are not exposed from each of the sides of the ceramic main body part because the internal electrodes made of palladium (Pd) shrink during calcining process. FIG. 1B shows in section a ceramic main body part in such a state where the internal electrodes 11a,11b and 11c are not exposed very much from each side of it.

Figure 2:
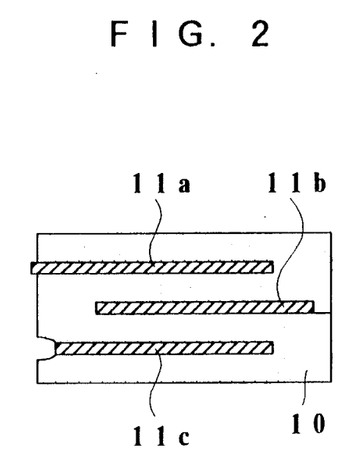
FIG. 2 is a cross-sectional view showing the ceramic main body part of FIG. 1B after barrel finishing.

Therefor, the ceramic main body part is subjected to a barrel finishing step in order to expose the internal electrodes from the sides of the ceramic main body part. In spite of barrel finishing, the internal electrodes 11b and 11c is not exposed well as shown in FIG. 2. Thereafter, referring to FIG. 3, a connector terminal electrode 20 is formed on each of the sides of the ceramic main body part of FIG. 2 by using technique of prior art.

Figure 3:
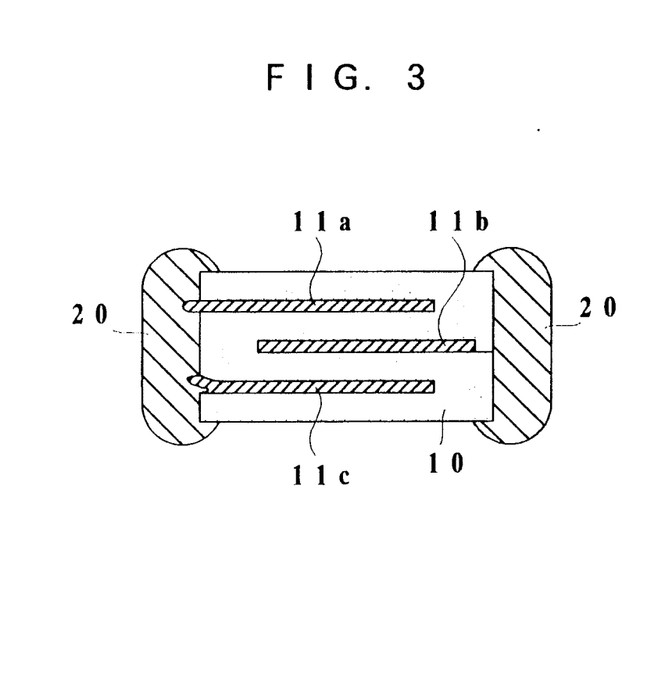
FIG. 3 is a cross-sectional view showing a connector terminal electrode is formed on each side of the ceramic main body part of FIG. 2.

Specifically, silver (Ag) powder or a mixture of a silver powder and a palladium powder, glass frit and bonding material is mixed into a paste. This paste is applied onto the sides of the ceramic main body part 10 and is calcined at a temperature of 750° C. through 850° C. Thereafter, nickel is plated on the calcined paste to finish the terminal electrode 20. Note that soft solder or tin may be plated thereon.

However, though as shown in FIG. 3 the internal electrodes 11a and 11c connect with the terminal electrode 20 the internal electrode 11b is disconnected with the terminal electrode 20. Note that the internal electrode 11c is loosely connected with the terminal electrode 20. Such a contact is referred to as "loose contact".

Such a disconnection between the internal electrode and the connector terminal electrode 20 is because the internal electrodes are not exposed well from each of the side of the ceramic main body part 10 when the connector terminal electrode 20 is formed on each of the side of the ceramic main body part 10. The failure of exposure is due to the following cases:

When the barrel finishing is not complete enough to expose the internal electrodes.

When the internal electrodes are too thin.

When the exposed portion of the internal electrodes is damaged.

When the ceramic layers cover with the internal electrodes.

These facts lead to decrease in electric capacity and increase in dielectric loss tangent in a lamination capacitor. In particular, temperature compensated lamination capacitors suffer from these problems because the temperature compensated capacitor has a small tolerance of both electric capacity and dielectric loss tangent.

OBJECTS AND SUMMARY OF THE INVENTION

It is an object of the present invention to provide a method for forming connector terminal electrodes of a lamination capacitor which has firm connection between the internal electrodes and the connector terminal electrode.

According to an embodiment of the present invention, a method for forming connector terminal electrodes of a lamination capacitor containing a ceramic main body part having opposed two sides and a plurality of internal electrodes therein, the method comprises steps of:

a) putting the ceramic main body part into a mixture of at least two powders, one being a metal powder with a diffusion coefficient different from the internal electrodes and the other being a ceramic powder which is inactive to both the internal electrode and the metal powder, b) subjecting the ceramic main body part in the mixture to a heat treatment at a heat temperature, and c) forming a connector terminal electrode on each of the sides of the ceramic main body part.

While the novel features of the invention are set forth in a general fashion, particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 10 is a table showing electric capacity and dielectric loss tangent of temperature compensated capacitors having connector terminal electrodes obtained by using the sputtering technique.

DESCRIPTION OF THE PREFERRED EMBODIMENT

A method for forming a connector terminal electrode of a lamination capacitor according to one embodiment of the present invention will be described below.

An internal electrode whose thickness is thinner than the standard is formed on each dielectric ceramic layer using an ink of palladium by screen printing technique.

A hexahedral ceramic main body part obtained in this fashion is subjected to a heat and press treatment. Thereafter, the ceramic main body part is subjected to a cut step to form it into a predetermined size. The ceramic main body part obtained in this fashion is the same as ceramic main body part of FIG. 1b.

Referring to FIG. 1b, the internal electrodes are not exposed from the sides of the main body part 10 because the internal electrodes made of palladium shrink during calcining process. Thereafter, such a main body part is subjected to a barrel finishing step where kinds of media are used. Even when the barrel finishing was implemented, there are many cases where the internal electrodes are not exposed from the sides of the ceramic main body part.

Then, 10 to 50% by weight of silver (Ag) powder 1 μm in particle size which is one of metal powders is mixed with 50 to 90% by weight of zirconium powder 100 μm in particle size which is one of ceramic powders. Note that the zirconium powder is used to prevent the silver powder from aggregating when heat is applied to this mixture.

Although in this embodiment the zirconium powder is used as ceramic powders, in alternative embodiment a powder of alumina or a mixture of an alumina powder and a zirconium powder may be used.

Figure 4:
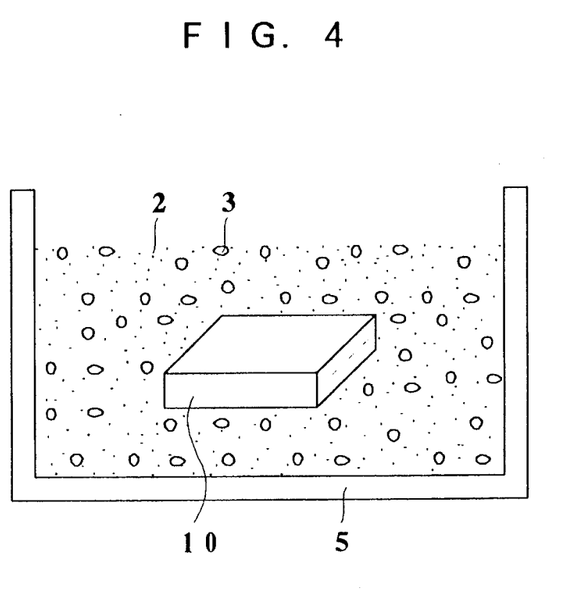
FIG. 4 is a conceptional view showing a mixture of a silver powder, a zirconium powder and a ceramic main body part is put into a heat-resistant container.

Furthermore, the mixture is mixed with 50% by weight of the ceramic main bodies. This mixture is put into a heat-resistant container made of ceramic, stainless, Inconel (in trade mark) or the like. In this embodiment, FIG. 4 shows a heat-resistant container 5 into which the mixture of a silver powder 2, a zirconium powder 3 and a ceramic main body part 10 is put. Note that FIG. 4 shows single one ceramic main body part 10 for simplicity.

After the heat-resistant container 5 is placed in a furnace it is subjected to a heat treatment. In the heat treatment, the temperature is increasing from a normal temperature into a heat temperature of 823° C. at the rate of 30° C. a minute. The heat-resistant is then kept at the heat temperature of 823° C. for a heat time of eight minutes. Furthermore, the heat temperature is decreasing into a normal temperature at the rate of 30° C. a minute. Note that the heat temperature of 823° C. is a temperature where the mixture is capable of being diffused thermally.

Although in this embodiment the main body part in the mixture is kept at the heat temperature of 823° C. for a heat time of eight minutes, in alternative embodiments the main body part in the mixture may be kept at a heat temperature between 500° C. and 900° C. for a heat time between five minutes and thirty minutes, or at a heat temperature of about 800° C. for a heat time between five minutes and fifteen minutes.

The above-described heat treatment lead to thermal diffusion process between the metal powder and the internal electrode which has a diffusion coefficient other than that of the metal powder. Specifically, since the metal powder is made of silver and the internal electrodes are made of palladium, silver diffuse into palladium. This means that the unexposed internal electrodes are exposed from the side of the ceramic main body part 10. In the diffusion process the diffusion length L is given by:

$$L = 2 \times (D \times t)^{\frac{1}{2}}$$

where "D" represents diffusion coefficient (cm²/s) and "t" represents heat temperature (K). The diffusion coefficient D showing speed of the diffusion is given by:

$$D = D^\circ \exp(-Q/RT)$$

where "Q" represents activation energy (cal/mol). Note that "R" is the gas constant and "T" is the absolute temperature.

Since diffusion length from silver to palladium depend on heat temperature "t", the diffusion length is controlled easily.

Figure 5:
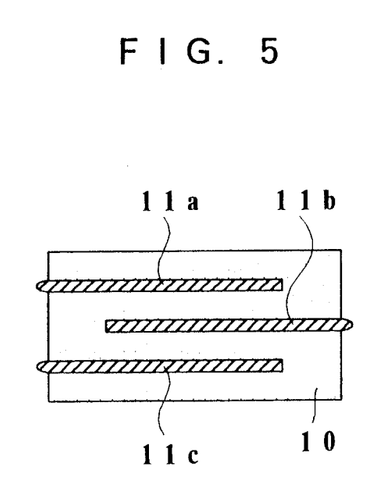
FIG. 5 is a cross-sectional view showing the ceramic main body part separated from the heat-resistant container.

After the heat treatment, the ceramic main body part 10 is separated from both the metal powder 2 and the ceramic powder 3 by a sieve. FIG. 5 shows the separated ceramic main body part 10 in sectional view. FIG. 5 shows that the internal electrodes 11a,11b and 11c are exposed from the sides of the ceramic main body part 10.

A method for forming a connector terminal electrode on each side of the ceramic main body part of FIG. 5 will be described below.

Figure 6:
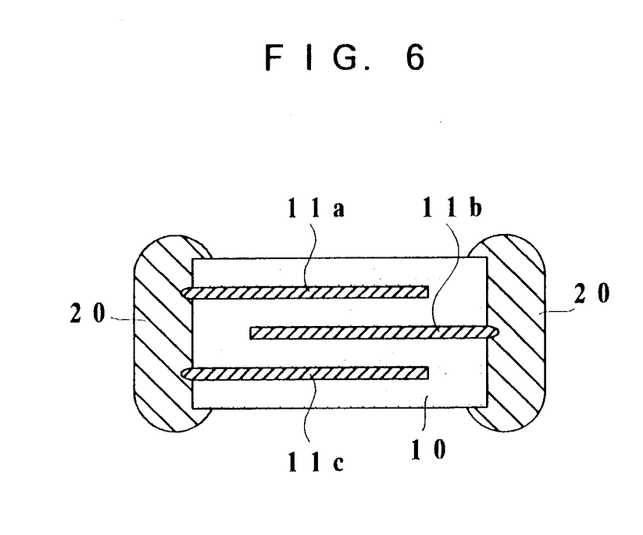
FIG. 6 is a cross-sectional view showing a connector terminal electrode is formed on each side of the ceramic main body part of FIG. 5 using a technique.

Referring to FIG. 6, silver powder or mixture of silver powder and palladium powder, glass frit and bonding material are mixed into paste. The paste, not shown is applied onto the side of the ceramic main body part 10 and is calcined at a temperature of 750° C. through 850° C. Thereafter, nickel is plated on it to form the connector terminal electrodes 20. Note that tin or soft solder may be plated thereon.

Apparently from FIG. 6, the internal electrodes 11a,11b and 11c in the ceramic main body part 10 are completely electrically connected with the connector terminal electrodes 20.

A method for forming a connector terminal electrode on each side of the ceramic main body part of FIG. 5 according to another embodiment of the present invention will be described. To form the connector terminal electrodes, a layer of chromium, a layer of nickel and a layer of tin is applied onto each side of the ceramic main body part 10.

Figure 7:
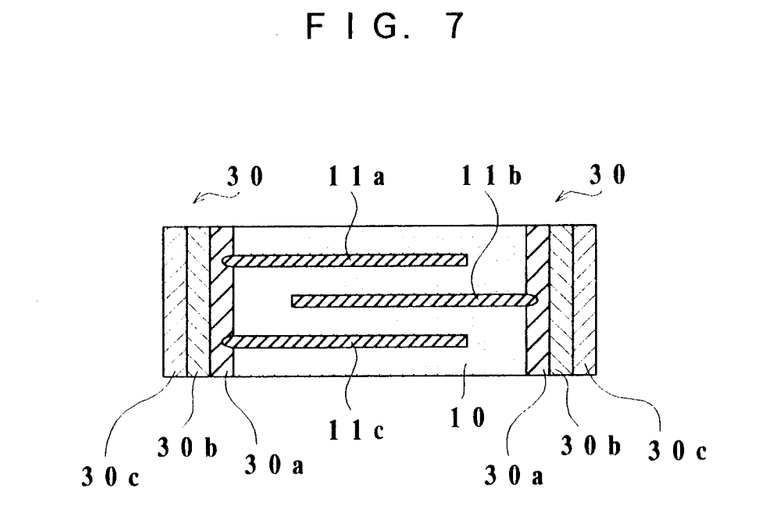
FIG. 7 is a cross-sectional view showing a connector terminal electrode is formed on each side of the ceramic main body part of FIG. 5 using another technique.

More specifically, at first the ceramic main body part 10 is set in a sputtering machine. Referring to FIG. 7, the ceramic main body part 10 is subjected to a sputtering step to form the layer 30a of chromium which is highly adhesive to ceramic. Then, the ceramic main body part is subjected to a sputtering step to form the layer 30b of nickel which is capable of soldering on the layer of chromium. Then, the ceramic main body part 10 is subjected to a sputtering step to form the layer 30c of tin having solder wettability as shown in FIG. 7.

The connector terminal electrodes of determined size can be formed by using such a sputtering technique. Also, such a sputtering technique have advantages in forming the connector terminal electrodes of thinness. Therefore, the lamination capacitor can be form into a predetermined size more precisely and can be more integrated. Note that the connector terminal electrodes are formed on the sides of the ceramic main body part by one.

Figure 8:
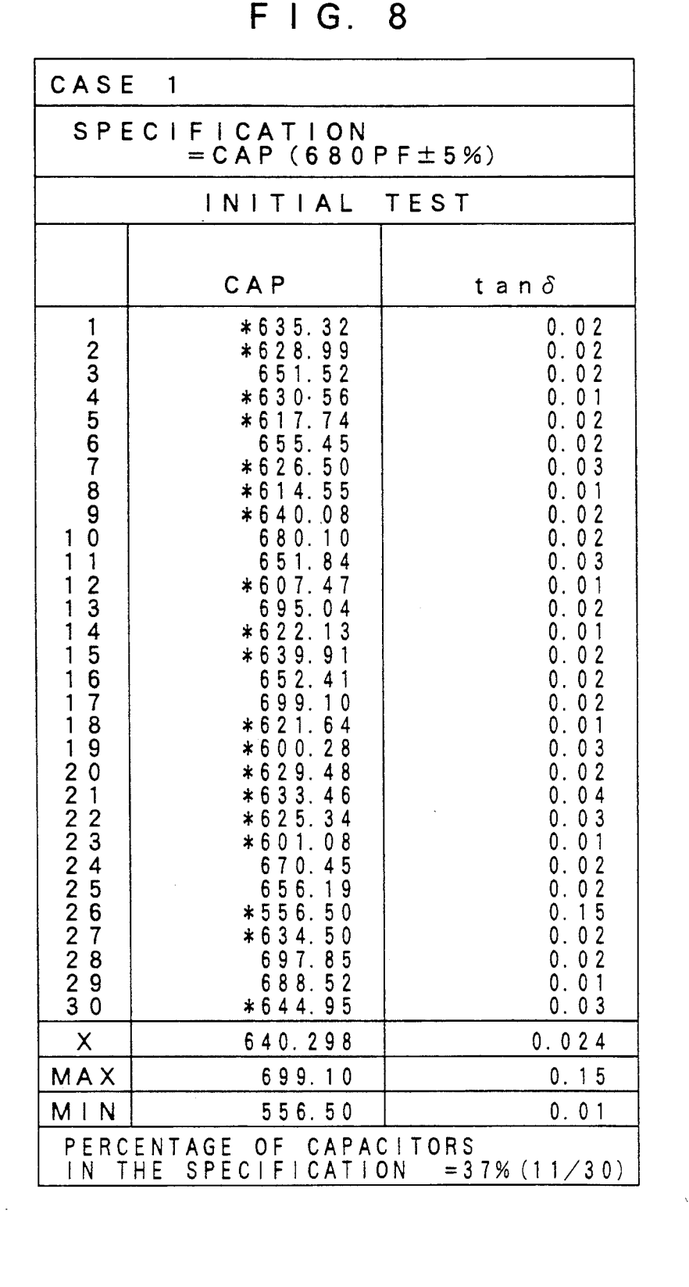
FIG. 8 is a table showing electric capacity and dielectric loss tangent of temperature compensated capacitors having connector terminal electrodes obtained by using a sputtering technique.
Figure 9:
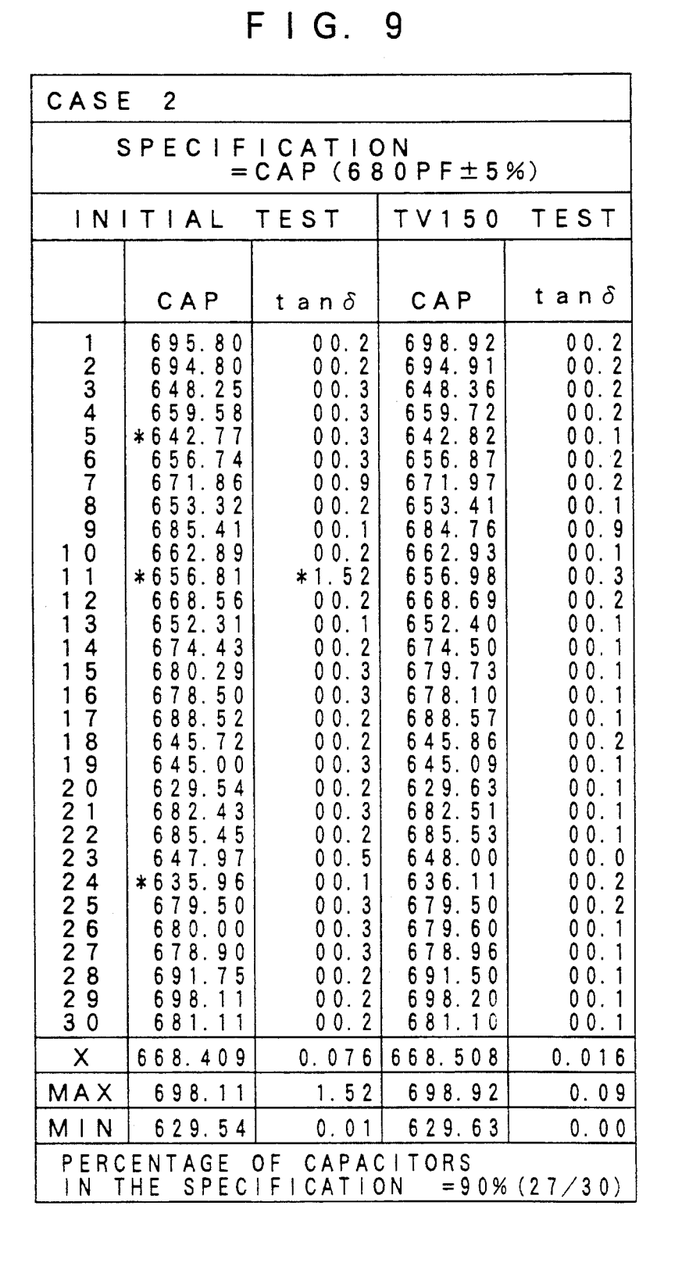
FIG. 9 is a table showing electric capacity and dielectric loss tangent of temperature compensated capacitors having connector terminal electrodes obtained by using the sputtering technique.

Meanwhile, FIG. 8, FIG. 9 and FIG. 10 show each a table telling of electric capacity and dielectric loss tangent of temperature compensated capacitors having connector terminal electrodes obtained by using the above sputtering technique.

In the table of FIG. 8 (case 1 hereafter) there are used the above temperature compensated capacitors, which are not subjected to the above-mentioned heat treatment to diffuse the mixture thermally.

Figure 11:
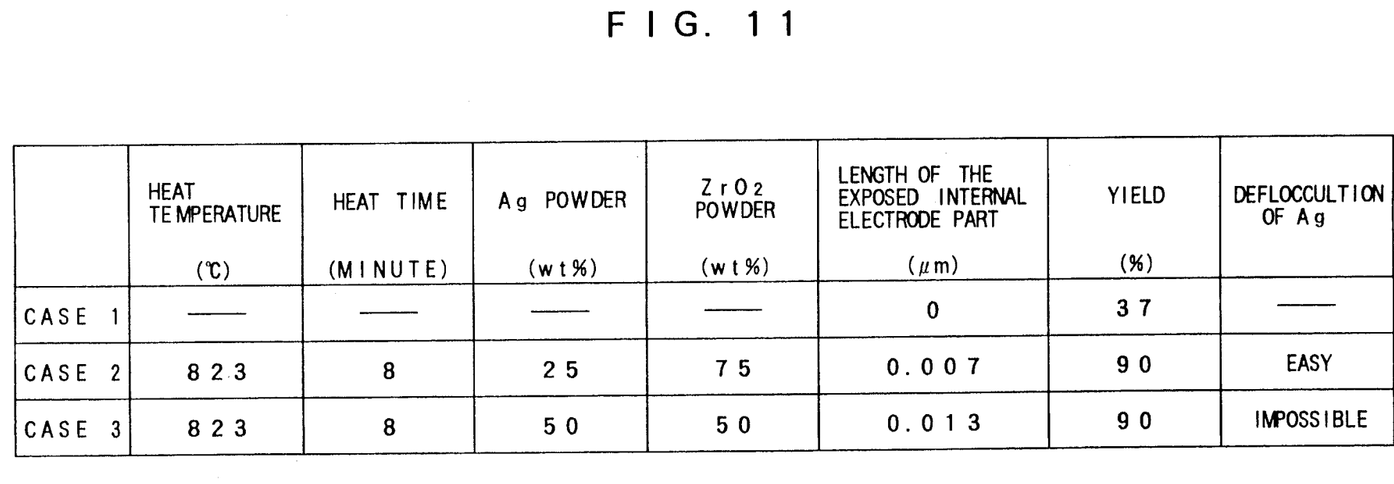
FIG. 11 is a table showing length of the exposed internal electrode part after heat treatment, percentage of capacitors in the specification, "deflocculation of Ag" and each condition (heat temperature, heat time, ration in the mixture) of heat treatment.

On the other hand, in the tables of FIG. 9 (case 2 hereafter) and FIG. 10 (case 3 hereafter) there are used the two kinds of temperature compensated capacitors which are subjected to their respective different heat treatment step. The table of FIG. 11 is used for comparing the respective results.

In each case, thirty temperature compensated capacitors are measured for electric capacity and dielectric loss tangent. Each measured value is compared with the predetermined specification value and percentage of capacitors in the specification is shown in each table. Note that this measure is implemented after the temperature compensated capacitors keep at a determined temperature for a determined time. This measure is referred to as "Initial test".

Meanwhile, in case 2 and case 3, the measured temperature compensated capacitors are measured for electric capacity and dielectric loss tangent again after a voltage of more than the rated voltage (150 volts herein) are applied to them. The measured value is shown in each table. This measure is referred to as "TV 150 test".

When a larger voltage than rated voltage is applied to a temperature compensated capacitor having loose contacts there are a lot of cases where electric capacity thereof is out of the specification because of break of loose contact. Therefore, this "TV 150 test" is implemented to detect temperature compensated capacitors having loose contacts.

In case 1 where the temperature compensated capacitors to be measured are not subjected to the abovedescribed heat treatment, the number of capacitors out of the specification is 19. Note that a mark "*" shows the temperature compensated capacitor is out of the specification.

In case 2 where the temperature compensated capacitors to be measured are subjected to the abovedescribed heat treatment using the mixture which is contain of 25% by weight of silver powder and 75% by weight of ceramic powder, the number of capacitor out of the specification is 3. Note that a mark "*" shows the temperature compensated capacitor is out of the specification.

Referring to TV 150 test, there is little difference between electric capacity values before and after TV 150 test. This means the temperature compensated capacitors have few loose contacts.

Similarly, in case 3 where the temperature compensated capacitors to be measured are subjected to the above-described heat treatment using the mixture is contain of 50% by weight of silver powder and 50% by weight of ceramic powder, the number of capacitor out of the specification is 3. Note that a mark "*" shows the temperature compensated capacitor is out of the specification. Referring to TV 150 test, there is little difference between electric capacity values before and after TV 150 test. This means the temperature compensated capacitors have few loose contacts.

FIG. 11 is a table showing length of the exposed internal electrode part after heat treatment, percentage of capacitors in the specification, "deflocculation of Ag" and each condition (heat temperature, heat time, ration in the mixture) of heat treatment. Apparently from FIG. 11, this yield is over 90 percentage because the internal electrodes are exposed by using method for forming terminal electrode according to the present invention.

The temperature compensated capacitor used in the above cases is made of palladium and 2.0 mm by 1.25 mm by 1.0 mm in size. Note that "deflocculation of silver" shows a level of how a flocculated silver powder gets deflocculated.

As shown in FIG. 11, in the case 2 it is easy to defloc-culate the flocculated silver powder but in the case 3 it is impossible to do that. Therefore, there is preferably used the mixture which is contain of 25% by weight of silver powder and 75% by weight of ceramic powder. However, there may be used a mixture of any other rate provided that heat treatment of other conditions exposes the unexposed internal electrodes from the side of the ceramic main body part 10 and that it is easy to deflocculate the silver powder flocculated in the conditions.

In the above-described embodiments the ceramic main body part is subjected to the heat treatment after the heat-resistant container 5 containing the metal powder 2, the ceramic powder and the ceramic main body part is placed in a furnace. However, in alternative embodiments a ceramic main body part may be subjected to an adequate heat treatment after the ceramic main body part is put into the mixture heated in advance.

Also, in alternative embodiments a ceramic main body part may be subjected to an adequate heat treatment after the ceramic main body part heated in advance is put into the mixture. Note that in the alternative embodiments difference in temperature between the mixture and the ceramic main body part is preferably less than 200° C. because rapid change in temperature damage the ceramic main body part.

Although in the above-described embodiments the internal electrode is made of palladium and the metal powder is made of silver, in alternative embodiments silver may form the internal electrode and palladium may form the metal powder so that palladium diffuse into silver and the unexposed internal electrodes are exposed from the side of the ceramic body part.

Also, in alternative embodiments to connect the internal electrode with the connector terminal electrode firmly alloy between silver and palladium may form the internal electrode and may form the metal powder.

Although the invention has been described in its preferred form with a certain degree of particularity, it is understood that the present disclosure of the preferred form has been changed in the details of its construction and any combination and arrangement of parts may be resorted to without departing from the spirit and the scope of the invention as hereinafter claimed.

What is claimed is:

1. A method for forming connector terminal electrodes of a lamination capacitor containing a ceramic main body part having opposed two sides and a plurality of internal electrodes therein, the method comprising steps of:
   a) putting the ceramic main body part into a mixture Of at least two powders, one being a metal powder with a diffusion coefficient different from the internal electrodes and the other being a ceramic powder which is inactive to both the internal electrode and the metal powder,
   b) subjecting the ceramic main body part in the mixture to a heat treatment at a heat temperature, and
   c) forming a connector terminal electrode on each of the sides of the ceramic main body part.

2. A method for forming connector terminal electrodes of a lamination capacitor according to claim 1, wherein at the heat temperature the mixture is capable of being diffused thermally.

3. A method for forming terminal electrodes of a lamination capacitor according to claim 2, wherein the heat temperature is between about 500° C. and about 900° C.

4. A method for forming terminal electrodes of a lamination capacitor according to claim 2, wherein the heat temperature is about 800° C.

5. A method for forming terminal electrodes of a lamination capacitor according to claim 2, wherein in the heat treatment the ceramic main body part in the mixture is kept at the heat temperature for a heat time between five minutes and thirty minutes.

6. A method for forming terminal electrodes of a lamination capacitor according to claim 4, wherein in the heat treatment the ceramic main body part in the mixture is kept at the heat temperature for a heat time between five minutes and fifteen minutes.

7. A method for forming terminal electrodes of a lamination capacitor according to claim 2, wherein the mixture is heated before putting the ceramic main body part into the mixture and subjecting the ceramic main body part to the heat treatment.

8. A method for forming terminal electrodes of a lamination capacitor according to claim 7, wherein before the heat treatment a difference between the temperature of the ceramic main body part and the temperature of the mixture is less than 200° C.

9. A method for forming terminal electrodes of a lamination capacitor according to claim 7, wherein in the heat treatment the ceramic main body part in the mixture is kept at the heat temperature for a predetermined heat time.

10. A method for forming terminal electrode of a lamination capacitor according to claim 7, wherein heat is applied to the ceramic main body part before putting the ceramic main body part into the mixture and subjecting the ceramic main body part to the heat treatment.

11. A method for forming terminal electrode of a lamination capacitor according to claim 10, wherein before the heat treatment a difference between the temperature of the ceramic main body part and the temperature of the mixture is less than 200° C.

12. A method for forming terminal electrode of a lamination capacitor according to claim 1, wherein the metal powder is made of silver.

13. A method for forming terminal electrode of a lamination capacitor according to claim 1, wherein the metal powder is made of palladium.

14. A method for forming terminal electrode of a lamination capacitor according to claim 1, wherein the metal powder is made of alloy between silver and palladium.

15. A method for forming terminal electrode of a lamination capacitor according to claim 1, wherein the ceramic powder is made of zirconium oxide.

16. A method for forming terminal electrode of a lamination capacitor according to claim 1, wherein the ceramic powder is a powder made of alumina.

17. A method for forming terminal electrode of a lamination capacitor according to claim 1, wherein the ceramic power is mixture between a powder made of zirconium oxide and a powder made of alumina.

18. A method for forming terminal electrode of a lamination capacitor according to claim 1, wherein the internal electrodes are made of silver.

19. A method for forming terminal electrode of a lamination capacitor according to claim 1, wherein the internal electrodes are made of palladium.

20. A method for forming terminal electrode of a lamination capacitor according to claim 1, wherein the internal electrodes are made of alloy between silver and palladium.

* * * * *